(12) United States Patent
McFeeters

(10) Patent No.: US 8,502,685 B2
(45) Date of Patent: Aug. 6, 2013

(54) ANTI-THEFT ALARM FOR A LIQUID STORAGE TANK

(76) Inventor: Kenneth McFeeters, Belfast (GB)

( * ) Notice: Subject to any disclaimer, the term of this patent is extended or adjusted under 35 U.S.C. 154(b) by 328 days.

(21) Appl. No.: 13/119,142

(22) PCT Filed: Sep. 15, 2009

(86) PCT No.: PCT/EP2009/006659
§ 371 (c)(1),
(2), (4) Date: Mar. 15, 2011

(87) PCT Pub. No.: WO2010/031531
PCT Pub. Date: Mar. 25, 2010

(65) Prior Publication Data
US 2011/0175739 A1    Jul. 21, 2011

(30) Foreign Application Priority Data
Sep. 16, 2008   (GB) .................................. 0816941.9

(51) Int. Cl.
*G08B 17/00*    (2006.01)
*G08B 13/14*    (2006.01)

(52) U.S. Cl.
USPC ......... 340/584; 340/618; 340/568.1; 340/571

(58) Field of Classification Search
USPC ........................ 340/584, 603, 618, 568.1, 571
See application file for complete search history.

(56) References Cited

U.S. PATENT DOCUMENTS

| 4,523,460 A | | 6/1985 | Strickler et al. |
| 4,551,719 A | * | 11/1985 | Carlin et al. .................... 340/3.7 |
| 5,434,559 A | * | 7/1995 | Smiley et al. .................. 340/571 |
| 6,172,607 B1 | * | 1/2001 | McDonald ..................... 340/571 |
| 7,212,103 B2 | | 5/2007 | Oyagi et al. |
| 7,944,369 B2 | * | 5/2011 | Appleyard et al. ............ 340/689 |

FOREIGN PATENT DOCUMENTS

| DE | 9209214 U1 | 9/1992 |
| EP | 1437272 A1 | 7/2004 |

OTHER PUBLICATIONS

International Search Report and Written Opinion for PCT/EP2009/006659, International Search report was completed by the European Patent Office on Dec. 18, 2009, Written Opinion was completed by the European Patent Office, 13 Pages.

* cited by examiner

*Primary Examiner* — Toan N Pham
(74) *Attorney, Agent, or Firm* — Brooks Kushman P.C.

(57) ABSTRACT

An anti-theft alarm for a liquid storage tank, said alarm comprising a housing having means for securing the housing to the storage tank, said housing containing a motion and/or vibration sensor for detecting tampering with the liquid storage tank, an alarm means and a control means for activating the alarm means in response to a signal from the motion/vibration sensor.

15 Claims, 3 Drawing Sheets

ANTI-THEFT ALARM FOR A LIQUID STORAGE TANK

CROSS-REFERENCE TO RELATED APPLICATION

This application is the U.S. national phase of PCT Appln. No. PCT/EP2009/006659 filed Sep. 15, 2009 which claims priority to GB application 0816941.9 filed Sep. 16, 2008, the disclosures of which are incorporated in their entirety by reference herein.

This invention relates to an anti-theft alarm for a liquid storage tank, and in particular to an anti-theft alarm for an oil or fuel tank, for example for a central heating system.

With ever increasing oil prices, the value of fuel oil stored in fuel tanks, particularly adjacent to a building to supply a heating system, is substantial, making the oil a target for thieves. A typical oil tank for a domestic central heating system can contain around £1200 of oil at present prices.

While attempts have been made to use padlocks, or other locking means, to secure the filling caps of fuel tanks, such are relatively ineffective against determined thieves, particularly because most fuel tanks are made from relatively thin, usually plastic, material, that can be relatively easily drilled or punctured to gain access to the contents, even if the main filling cap is locked.

Alarm systems have been devised for detecting tempering with oil tank closures and providing an audible or other warning. However, known systems have not been successful due to problems with false alarms and unreliability.

According to a first aspect of the present invention there is provided an anti-theft alarm for a liquid storage tank, said alarm comprising a housing having means for securing the housing to the storage tank, said housing containing a motion and/or vibration sensor for detecting tampering with the liquid storage tank, an alarm means and a control means for activating the alarm means in response to a signal from the motion/vibration sensor.

Preferably the control means controls the alarm means to perform a first action, such as to provide a relatively localised and short audible and/or visual alert, in response to a first detection of tampering by the motion/vibration sensor, the control means controlling the alarm means to perform a further action, such as to activate a full alarm response, in response to detection of tampering by the motion/vibration sensor one or more further times within one or more predetermined time periods, thus reducing the occurrence of false alarms and enabling the alarm means to provide a deterrent signal prior to full alarm activation.

In one embodiment, the control means controls the alarm means to issue a brief audible alert in response to a first detection of tampering by the motion/vibration sensor, a longer audible and/or visual warning upon a second detection of tampering by the motion/vibration sensor within a predetermined time interval from said first detection, and a full alarm response upon a third detection of tampering by the motion/vibration sensor within a further predetermined time interval from said second detection. Preferably the full alarm response includes a relatively prolonged visual and/or audible warning and/or the transmission of an alarm signal to a remote location and/or activation of a further device, such as a camera and/or illumination device.

A remote sensor may be provided for detecting motion and/or vibrations caused by environmental conditions, such as heavy rain or hail, said control means responding to a signal from the remote sensor to prevent activation of the alarm means due to such environmental conditions. The remote sensor may be provided at a location remote from the oil tank closure, such as on the roof of an adjacent building. In one embodiment, said control means may increase a threshold at which the alarm means is activated in response to said signal from the motion/vibration sensor, effectively reducing the sensitivity of the anti-theft alarm, thereby reducing the risk of false alarms due to said environmental conditions.

Said motion and/or vibration sensor may comprise one of a ball switch, a mercury switch, an accelerometer, a piezoelectric device, a magnetic or electromagnetic sensor device or any other suitable motion and/or vibration sensing means.

Preferably said housing includes one or more batteries for powering the alarm. The batteries may be rechargeable. One or more charging means, such as photovoltaic cells, may be provided for recharging the batteries. A layer of photovoltaic cells may be provided on an outer surface of the housing or the tank for charging the batteries.

The alarm means may be adapted to communicate with a remote location, for example to a pager or mobile phone, or to an alarm located at a remote location, for example in an adjacent building. The alarm means may include an rf transmitter. The alarm means may comprise a local sounder for emitting a local audible alert upon activation of the alarm means. One or more lights may be provided on an outer region of the housing for providing a visual alert upon activation of the alarm means.

The housing may be secured within an opening in the tank such that the housing extends into the tank to protect the components of the alarm. In one embodiment, the housing is mounted on a filling cap for closing a filling opening of the tank such that the housing extends into the tank when the filling cap is fitted to the filling opening. Preferably the housing is mounted on an inner surface of a filling cap. Thus the alarm can be relatively easily retrofitted to an existing liquid storage tank. Alternatively, the housing may be mounted on an exterior surface of the tank.

The control means may be adapted to activate other security features, such as a security light adjacent the tank and/or a video surveillance camera adjacent the tank, upon detection of tampering by the motion/vibration sensor.

Preferably the control means includes a memory for recording the operation of the alarm. For example, the control means may be programmed to record the time and date of each detection of tampering by the motion/vibration sensor.

The control means may include a wireless remote control to enable the alarm means to be remotely set, reset and/or disabled.

The alarm may incorporate level sensing means for monitoring the level of liquid in the storage tank. The alarm may be adapted to communicate level information to a remote location and/or to provide a fuel level indication on the tank or alarm housing. The control means may be programmed to monitor the liquid level in the tank and activate the alarm means if the liquid level falls at a rate greater than a predetermined rate, indicative of unauthorised draining of the tank. The control means may be programmed to provide a warning when the liquid level reaches a predetermined minimum level to alert a user to the need to refill the tank. Such low liquid level warning may be provided remotely from the storage tank, for example on a control panel within an adjacent building.

In one embodiment, the level sensing means may comprise a transmitter for transmitting a signal into the tank and a receiver for receiving a reflection of the signal, for example from the surface of the fluid within the tank, and processing means for determining the level in the tank based upon a time delay and/or frequency shift in the received signal. Preferably the transmitted signal is a sound. The fuel level may be determined by determining a resonant frequency of an air volume in the head space of the tank, which is a function of its volume. Alternatively the fuel level sensor may comprise a float gauge.

The alarm may incorporate heat or smoke detection means whereby the alarm means may be activated in the event of a fire in or adjacent a tank to which the alarm is attached. The control means may be adapted to activate a fire alarm and/or extinguishing system associated with the tank in response to the detection of a fire by said heat or smoke detector. The control means of the alarm may be adapted to activate a fire alarm system remote from the tank upon detection of a fire.

Embodiments of the present invention will now be described, by way of example only, with reference to the accompanying drawings, in which:—

Figure 1:
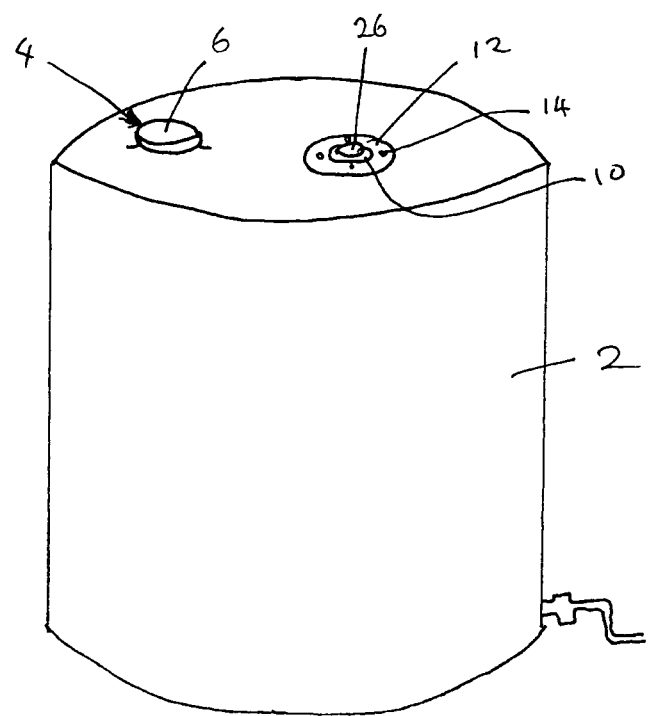
FIG. 1 is a perspective view of an anti-theft alarm according to a first embodiment of the present invention fitted to a heating oil storage tank.
Figure 2:
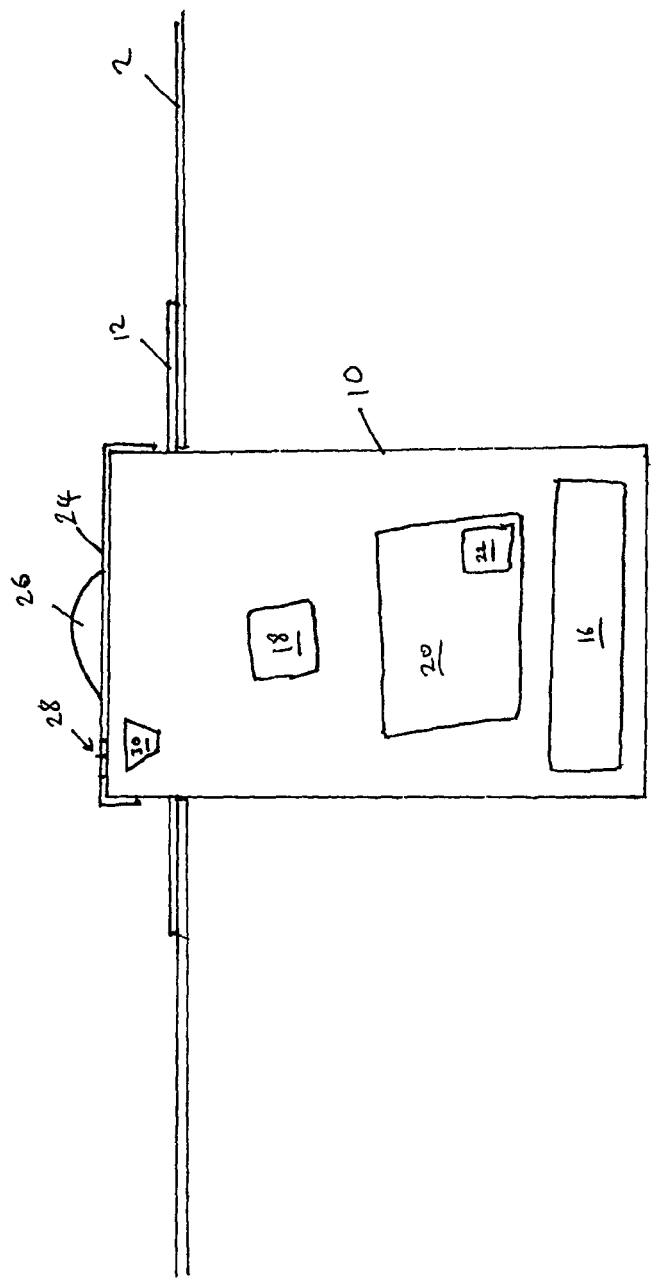
FIG. 2 is a sectional view through the alarm of FIG. 1.
Figure 3:
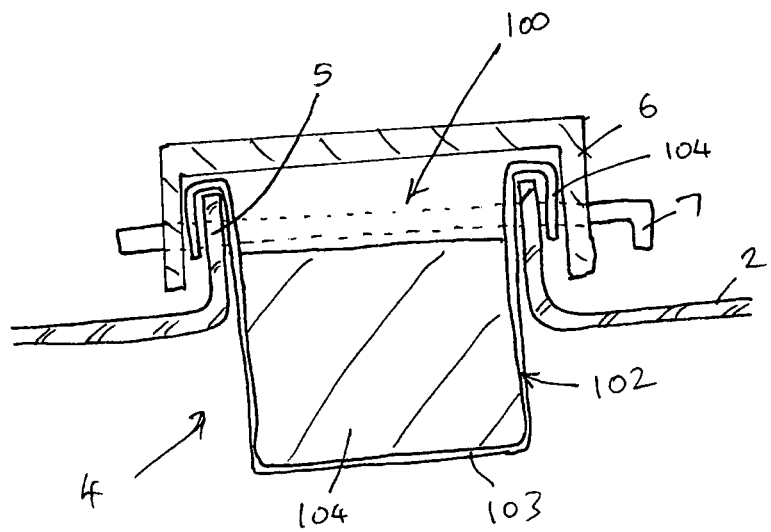
Figure 4:
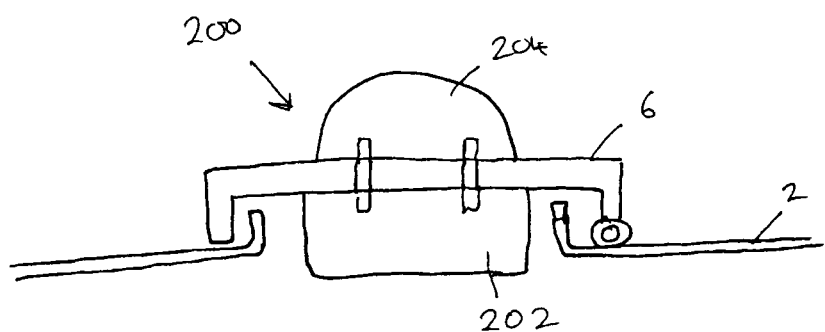

FIG. 3 is a sectional view through a filling opening of a tank having a closure cap incorporating an anti-theft alarm according to a second embodiment of the present invention; and FIG. 4 is a sectional view through a filling opening of a tank having a hinged closure cap incorporating an anti-theft alarm according to a third embodiment of the present invention FIG. 1 illustrates a fuel storage tank 2, such as that typically used to store heating oil. The tank 2 has a filling opening 4 fitted with a closure cap 6 at an upper region of the tank.

An anti-theft alarm according to a first embodiment of the present invention for preventing the theft of oil from the heating oil storage tank 2 comprises a substantially cylindrical housing 10 having a peripheral flange 12 by means of which the housing 10 is secured within an aperture in a wall or surface of the tank 2. The flange 12 is secured to the tank by tamperproof fastenings 14. The flange 12 forms a fluid tight seal against the wall of the tank 2.

Within the housing 10 is located one or more batteries 16, a motion sensor 18, such as that sold by ASSEMTech Europe Ltd as Type MS24, and a printed circuit board having a controller 20 mounted thereon. The controller 20 is provided with an rf 22 transmitter for communicating with a remote location The main components of the alarm are located within the secure, tamperproof housing 10, in this example inside the tank 2, to protect the components from tampering. A metal end cap 24 is secured to an outer end of the housing 10, said end cap 24 being removable to gain access to the electronic components of the alarm for servicing and to allow the replacement of the batteries 16. The metal end cap 24 may be threaded onto the end of the housing 10 and a special tool may be provided for unscrewing the end cap 24 while preventing unauthorised persons from removing the end cap 24. Solar cells may be provided on the outer surface of the end cap 24 of the housing or on the surface of the tank 2 for recharging the batteries 16. The controller 20 may be adapted to emit an audible warning such as a beep, or transmit a warning to a remote location, if the batteries need charging or replacing, for example upon detection of a drop in battery voltage.

A light emitter 26 may be located on an outer side of the end cap 24 and a waterproof opening 28 may be provided through which sound may be emitted from a sounder 30. The light emitter may comprise a flash to lead persons to believe that the activation of the alarm has resulted in the taking of a picture of the thief. The light emitted may be associated with a camera, as described below.

The controller 20 is adapted to monitor the motion sensor 18 and provide a first response, in the form of a short audible warning, such as a beep, from the sounder 30 when the motion sensor 18 detects a vibration, indicative of possible tampering with the tank. If the motion sensor 18 detects a further movement or vibration within a predetermined time interval from the first detection a second level of alarm activation is triggered, causing the controller 20 to activate a longer audible from the sounder 30, such as a spoken warning that the tank is protected by an anti-theft alarm, and optionally also a visual warning from the light emitter 26. If the motion sensor 18 detects a further movement or vibration with a predetermined time interval from the second detection, a full alarm response is activated, such as a prolonged visual and audible alarm from the sounder 30 and light emitter 26 and the transmission of an alarm signal to a remote location by the rf transmitter, such as an adjacent building, a control centre or to a pager or mobile telephone. If, after either a first or second detection, no further movement or vibration is detected by the motion sensor 18 within said predetermined interval, the controller 20 resets the alarm such that a subsequent detection causes the controller 20 to provide said first response.

A remote motion sensor (not shown) may be provided on an exposed location adjacent the oil tank, for example on thereof of an adjacent building, the remote sensor being connected to the controller 20, either by a wired or wireless connection, to detect a background level of "noise", such as vibrations caused by heavy rain or hail showers. The controller may be programmed to filter out such background vibrations to prevent false alarms, for example by reducing the sensitivity of the motion sensor 18 such that the alarm response is not triggered by such background vibrations.

The controller 20 may record a log of the signals received from the motion sensor 18 over time, including information regarding the date and time of any signals, which can be subsequently downloaded and analysed by the user. Such log may record normal use of the tank, such as normal dispensing and refilling operations, as well signals indicating tampering with the tank.

A video or still camera may be provided, connected to the controller 20 to take video or pictures of the surroundings of the tank upon a full alarm response, or ant other times, to enable identification of persons tampering with the tank. The controller 20 may activate a flash associated with the camera.

The alarm may be armed or disarmed and deactivated by a wireless remote control, either operating on an radio or infrared frequency, or may be provided with a key switch for arming and disarming the alarm.

An additional functionality can be provided by incorporating a fuel level gauge (not shown) into the alarm housing such that the controller 20 can monitor the fuel or liquid level in the tank and provide a measurement of the fuel level and/or provide a warning when the fuel level reaches a predetermined minimum level to remind the use to refill the tank before the tank runs dry. In one embodiment, such level gauge can comprise a transmitter and receiver arrangement on the inner end of the housing for transmitting a signal, for example a sonic pulse, into the tank and receiving an echo for determining the fuel level in the tank. Alternatively the liquid level can be determined by determining the volume of air in the head space of the tank by determining the resonant frequency of said head space. Alternatively a simple float gauge may be provided.

In an alternative embodiment the alarm housing may be mounted on the inner face of a filling cap of the tank, or may be integrated into the filling cap, such that the components of the alarm are located within the filling opening of the tank when the cap is closed.

In a second embodiment, shown in FIG. 3, the anti-theft alarm 100 is adapted to fit into a filling opening 4 of the tank 2. The components of the anti-theft alarm 100, comprising the batteries, controller, motion sensor and transmitter of the alarm, are mounted within a housing 102 having an upper peripheral lip 104 adapted to fit over a lip 5 of the filling opening of the tank 2, the housing 102 having a depending cylindrical cup shaped body 103 within which is mounted the components 104 of the anti-theft alarm such that the alarm components 104 are protected with the tank 2. The filling cap 6 of the tank fits over the housing 102 such that the housing 102 is protected by the filling cap 6. Typically a bar 7 is inserted through aligned apertures in the cap 6 and the peripheral lip 5 of the filling opening 4 to secure the cap 6 to the filling opening. The lip 104 of the housing 102 may be provided with corresponding apertures through which the bar 7 may pass.

FIG. 4 illustrated a further embodiment of the anti-theft alarm 200 according to the present invention adapted to be integrated into a hinged closure cap 6 of the tank 2.

A housing 202, containing the batteries, controller, motion sensor and transmitter of the alarm is secured to the underside of the closure cap 6 and a light emitter and sounder unit 104 is secured to the upper side of the closure cap 6 such that the cap is sandwiched between the housing 202 and the light emitter and sounder unit 204. Thus, when the cap 6 is closed, the alarm is protected by the closure cap 6.

In each of the above described embodiments, the housing of the alarm may contain a temperature sensor, such as a thermistor, thermocouple, semiconductor device, bimetallic device or another suitable temperature sensing means, whereby, when the temperature sensor detects a temperature in excess of a predetermined limit or a rate of temperature change in excess of a predetermined limit, indicative of a fire in or adjacent to the tank or simply an excessive temperature leading to a risk of explosion, the controller can activate the sounder and lighter emitted and may transmit a fire alarm alert signal to a remote fire alarm system, for example in an adjacent building. The controller may also be adapted to activate a fire extinguishing system, such as a sprinkler system, associated with the tank.

The present invention provides a simple and reliable anti-theft alarm for a liquid storage tank that can be readily retro-fitted to an existing tank and can detect any attempt to tamper with the tank, either by removing the filling cap or by drilling or cutting the tank to remove liquid there from. The alarm is particularly suited to protecting heating oil stored in domestic or commercial oil tanks, but is equally suitable for protecting any other high value liquid stored in tanks, such as fuel tanks of commercial vehicles, the fuel tanks of civil engineering plant and chemical storage tanks. The alarm system in accordance with the present invention may also be applied to the fuel tanks of vehicles, such as trucks or farm equipment or other mobile or stationary plant.

The present invention can provide an integrated solution to preventing theft and monitoring the fuel level in a heating oil storage tank or any other storage tank for storing a valuable liquid.

The invention is not limited to the embodiment(s) described herein but can be amended or modified without departing from the scope of the present invention.

The invention claimed is:

1. An anti-theft alarm for a liquid storage tank, said alarm comprising:

a housing having means for securing the housing to the storage tank, said housing containing a motion and/or vibration sensor for detecting tampering with the liquid storage tank;

an alarm means; and a control means for activating the alarm means in response to a signal from the motion/vibration sensor;

wherein the control means controls the alarm means to perform a first action, to provide a relatively localized and short audible and/or visual alert, in response to a first detection of tampering by the motion/vibration sensor, the control means controlling the alarm means to perform a further action, to activate a full alarm response, in response to detection of tampering by the motion/vibration sensor one or more further times within one or more predetermined time periods, thus reducing the occurrence of false alarms and enabling the alarm means to provide a deterrent signal prior to full alarm activation.

2. An alarm as claimed in claim 1, wherein the control means controls the alarm means to issue a brief audible alert in response to the first detection of tampering by the motion/vibration sensor, a longer audible and/or visual warning upon a second detection of tampering by the motion/vibration sensor within a predetermined time interval from said first detection, and the full alarm response upon a third detection of tampering by the motion/vibration sensor within a further predetermined time interval from said second detection.

3. An alarm as claimed in claim 2, wherein the full alarm response includes a relatively prolonged visual and/or audible warning and/or transmission of an alarm signal to a remote location and/or activation of a further device.

4. An alarm as claimed in claim 1, wherein alarm means are adapted to communicate with a remote location, for example to a pager or mobile phone, or to an alarm located at a remote location.

5. An alarm as claimed in claim 1, wherein the housing is securable within an opening in the tank such that the housing extends into the tank to protect the alarm.

6. An alarm as claimed in claim 5, wherein the housing is mounted on a filling cap for closing a filling opening of the tank such that the housing extends into the tank when the filling cap is fitted to the filling opening, preferably on an inner surface of a filling cap or on an exterior surface of the tank.

7. An alarm as claimed in claim 1, further comprising a remote sensor for detecting motion and/or vibrations caused by environmental conditions, said control means responding to a signal from the remote sensor to prevent activation of the alarm means due to such environmental conditions, the remote sensor preferably being provided at a location remote from the oil tank closure.

8. An alarm as claimed in claim 7, wherein said control means increases a threshold at which the alarm means is activated in response to said signal from the motion/vibration sensor, effectively reducing sensitivity of the anti-theft alarm, thereby reducing risk of false alarms due to said environmental conditions.

9. An alarm as claimed in claim 1, wherein the control means includes a memory for recording operation of the alarm and wherein the control means is programmed to record time and date of each detection of tampering by the motion/vibration sensor.

10. An alarm as claimed in claim 1, further comprising a level sensing means for monitoring the level of liquid in the storage tank.

11. An alarm as claimed in claim 10, wherein the control means is programmed to provide a warning when the liquid level reaches a predetermined minimum level to alert a user to refill the tank.

12. An alarm as claimed in claim 11, wherein such low liquid level warning is provided remotely from the storage tank, for example on a control panel within an adjacent building.

13. An alarm as claimed in claim 10, wherein the level sensing means comprises a transmitter for transmitting a signal into the tank and a receiver for receiving a reflection of the signal from a surface of the liquid within the tank, and processing means for determining the level in the tank based upon a time delay and/or frequency shift in a received signal.

14. An alarm as claimed in claim 13, wherein the transmitted signal is a sound and wherein the liquid level is determined by determining a resonant frequency of an air volume in a head space of the tank, which is a function of its volume.

15. An alarm as claimed in claim 1, further comprising a heat or smoke detection means whereby the alarm means may be activated in an event of a fire and/or excessive temperature in or adjacent a tank to which the alarm is attached.

\* \* \* \* \*